United States Patent
Wright

(10) Patent No.: US 7,089,508 B1
(45) Date of Patent: Aug. 8, 2006

(54) METHOD AND SYSTEM FOR PREVENTING THE ACTIVATION OF A COMPUTER SCREEN SAVER

(75) Inventor: Robert E. Wright, Marietta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 715 days.

(21) Appl. No.: 10/254,116

(22) Filed: Sep. 25, 2002

(51) Int. Cl.
G06F 3/00 (2006.01)
G06F 1/26 (2006.01)

(52) U.S. Cl. .................. 715/867; 713/300

(58) Field of Classification Search ........... 713/300, 713/310, 320, 323; 715/867
See application file for complete search history.

(56) References Cited

U.S. PATENT DOCUMENTS

| | | | | |
|---|---|---|---|---|
| 5,768,604 A | * | 6/1998 | Yamazaki et al. | 713/323 |
| 6,108,028 A | * | 8/2000 | Skarbo et al. | 348/14.03 |
| 6,367,020 B1 | * | 4/2002 | Klein | 726/26 |
| 6,374,145 B1 | * | 4/2002 | Lignoul | 700/17 |
| 6,384,852 B1 | * | 5/2002 | Ye et al. | 715/867 |
| 6,384,853 B1 | * | 5/2002 | Shaffer et al. | 715/867 |
| 6,404,447 B1 | * | 6/2002 | Kitagawa | 715/867 |
| 6,560,711 B1 | * | 5/2003 | Given et al. | 726/34 |

* cited by examiner

*Primary Examiner*—Sy D Luu
(74) *Attorney, Agent, or Firm*—Merchant & Gould

(57) ABSTRACT

A method and system are provided for preventing the activation of a screen saver for locking user access to a computer while a user is near the computer. A controller capable of generating signals corresponding to an input device is connected to a user interface of a computer. The controller is connected to computer input devices (such as a keyboard or a mouse) and serves as a pass-through to the user interface for the input devices. The controller also includes a motion sensor for detecting a user's activity within a predetermined perimeter of the computer. The controller then determines if the user activity is non-computer activity by determining if input signals are being received from one of the computer input devices. If input signals are not being received from the computer input devices, the controller generates a pseudo user input corresponding to a command from a computer input device to prevent the screen saver from activating.

17 Claims, 4 Drawing Sheets

METHOD AND SYSTEM FOR PREVENTING THE ACTIVATION OF A COMPUTER SCREEN SAVER

FIELD OF THE INVENTION

The present invention relates to a method and system for preventing the activation of a screen saver on a computer.

BACKGROUND OF THE INVENTION

In today's society, the security of information stored on personal computers is of significant concern, especially in office environments where multiple persons may have access to a single computer. In recent years, a number of computer software applications have been developed to prevent access to personal computers. For example, screen saver programs include a security feature which hides a computer user's work from would-be snoopers if there are no keystrokes or mouse movements for a specified duration. These screen savers fill the computer display with an image or animation locking access to the personal computer until the user enters a password.

In office environments, personal computer security guidelines require that the screen saver lock access to the computer after a specified period of keyboard or mouse inactivity. The purpose of these guidelines is to ensure that the computer is not left unattended and thus subject to access by unauthorized users. Authorized users may gain access (i.e., logon) to a locked computer by entering an ID and password. These security guidelines are often ignored, however, because the screen saver activates and locks computer access while the authorized user is still in the office performing non-computer activities (such as reading, writing, talking on the telephone, etc.). Thus, when the user returns to their computer after performing these activities, the screen is locked, requiring the user to re-enter their ID and password.

Therefore, there is a need in the art for a method and system for preventing the activation of a screen saver for locking user access to a computer while a user is near the computer, but performing non-computer activities.

SUMMARY OF THE INVENTION

Illustrative embodiments of the present invention provide a system and method for preventing the activation of a screen saver for locking user access to a computer while a user is near the computer, but performing non-computer activities.

In one embodiment, a controller capable of generating signals corresponding to an input device is connected to a user interface of a computer. The controller is connected to computer input devices (such as a keyboard or a mouse) and serves as a pass-through to the user interface for these devices. The controller also includes a motion sensor, such as a motion detector, for detecting a user's activity within a predetermined perimeter of the computer. The controller then determines if the user activity is non-computer activity by determining if input signals are being received from one of the computer input devices. If input signals are not being received from the computer input devices, the controller generates a series of input signals to the computer processor through the user interface. The input signals, when received by the computer processor, are interpreted as a command from a computer input device, thus preventing the screen saver from activating. In another embodiment, the controller prevents the screen saver from activating by generating the input signal prior to a predetermined period for the activation of the screen saver.

BRIEF DESCRIPTION OF THE DRAWINGS

The system and methods for preventing the activation of a screen saver are further described with reference to the accompanying drawings in which.

DETAILED DESCRIPTION OF ILLUSTRATIVE EMBODIMENTS

Figure 1:
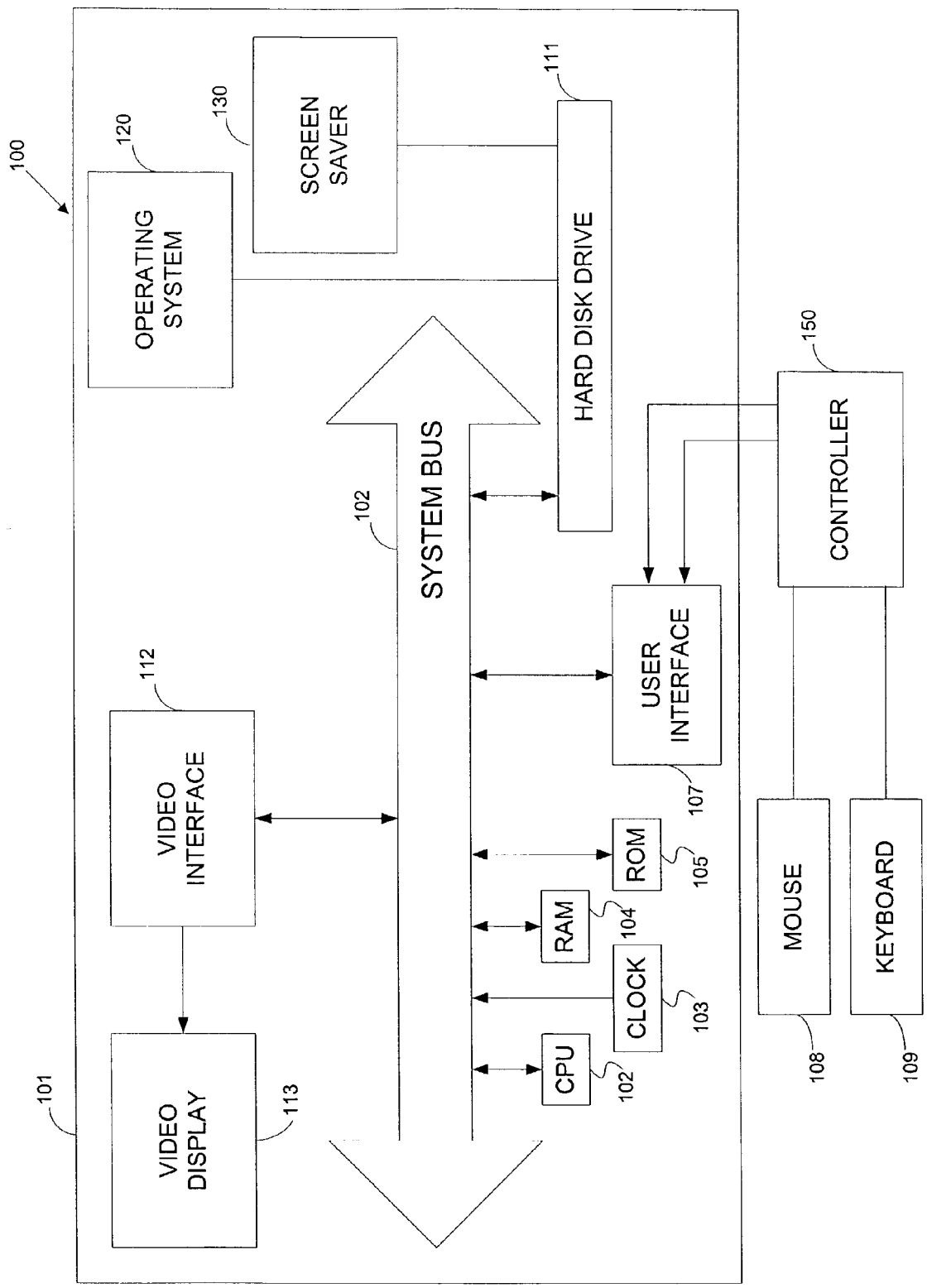
FIG. 1 is a block diagram of a computing system in which the present invention may be implemented.

FIG. 1 is a block diagram of a computing system 100 in which the present invention may be implemented. The computing system 100 is only one example of a suitable computing environment and is not intended to suggest any limitation as to the scope of use or functionality of the invention. Neither should the computing system 100 be interpreted as having any dependency or requirement relating to any one or combination of components illustrated in the exemplary computing system 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, an exemplary system for implementing the invention includes a general-purpose computing device in the form of a computer 101. Components of computer 101 may include, but are not limited to, a central processing unit 102, a system memory 104, and a system bus 102 that couples various system components to the central processing unit 102. The system bus 102 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 101 typically includes a variety of computer readable media. Computer readable media can be any available media that can be accessed by computer 101 and includes both volatile and nonvolatile media, removable and non-removable media. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 101.

The computer 101 includes computer storage media in the form of volatile and/or nonvolatile memory such as read only memory (ROM) 105 and random access memory (RAM) 104. A basic input/output system (BIOS—not shown), containing the basic routines that help to transfer information between elements within computer 101, such as during start-up, is typically stored in ROM 105. RAM 104 typically contains data and/or program modules that are immediately accessible to and/or presently being operated on by central processing unit 102.

The computer 101 may also include other removable/non-removable, volatile/nonvolatile computer storage media 111. The drives and their associated computer storage media discussed above and illustrated in FIG. 1, provide storage of computer readable instructions, data structures, program modules and other data for the computer 110. In FIG. 1, for example, hard disk drive 111 is illustrated as storing operating system 120 and an application program such as screen saver program 130.

A user may enter commands and information into the computer 101 through input devices such as a keyboard 109 and mouse 108. Other input devices (not shown) may include a trackball, touchpad, microphone, joystick, game pad, satellite dish, scanner, video camera or the like. These and other input devices are often connected to the central processing unit 102 through a user input interface 107 that is coupled to the system bus, but may be connected by other interface and bus structures (not shown), such as a parallel port, game port or a universal serial bus (USB). In operation, input devices (such as mouse 108 and keyboard 109) generate signals called interrupts which causes the operating system to temporarily current processing and divert its attention to the service required by the interrupt signal. The operation of input devices and their effect on computer operating systems is well known to those skilled in the art.

As shown in FIG. 1, input devices 108 and 109 are connected to a controller 150. Controller 150 serves as a pass-through device for passing input signals generated from input devices 108 and 109 to user interface 107. Controller 150 is also capable of generating input signals corresponding to commands from a computer input device. The operation of controller 150 will be described in more detail with respect to the description of FIG. 2 below. Computer 101 may also include a video display 113 such as a monitor, which is connected to the system bus 102 via an interface, such as video interface 112.

The screen saver program 130 is shown in FIG. 1 as an application program although it may also be built into the operating system. Screen savers are well known to those skilled in the art as computer programs for generating an image that is activated on a personal computer display when no computer user activity (such as keystrokes or mouse movements) has been sensed for a predetermined period, which may be set by the user via a graphical user interface. When user activity is detected, the screen saver is deactivated. Typically, screen savers also provide the option of preventing access to the computer after activation until the user enters an identification and/or password.

Figure 2:
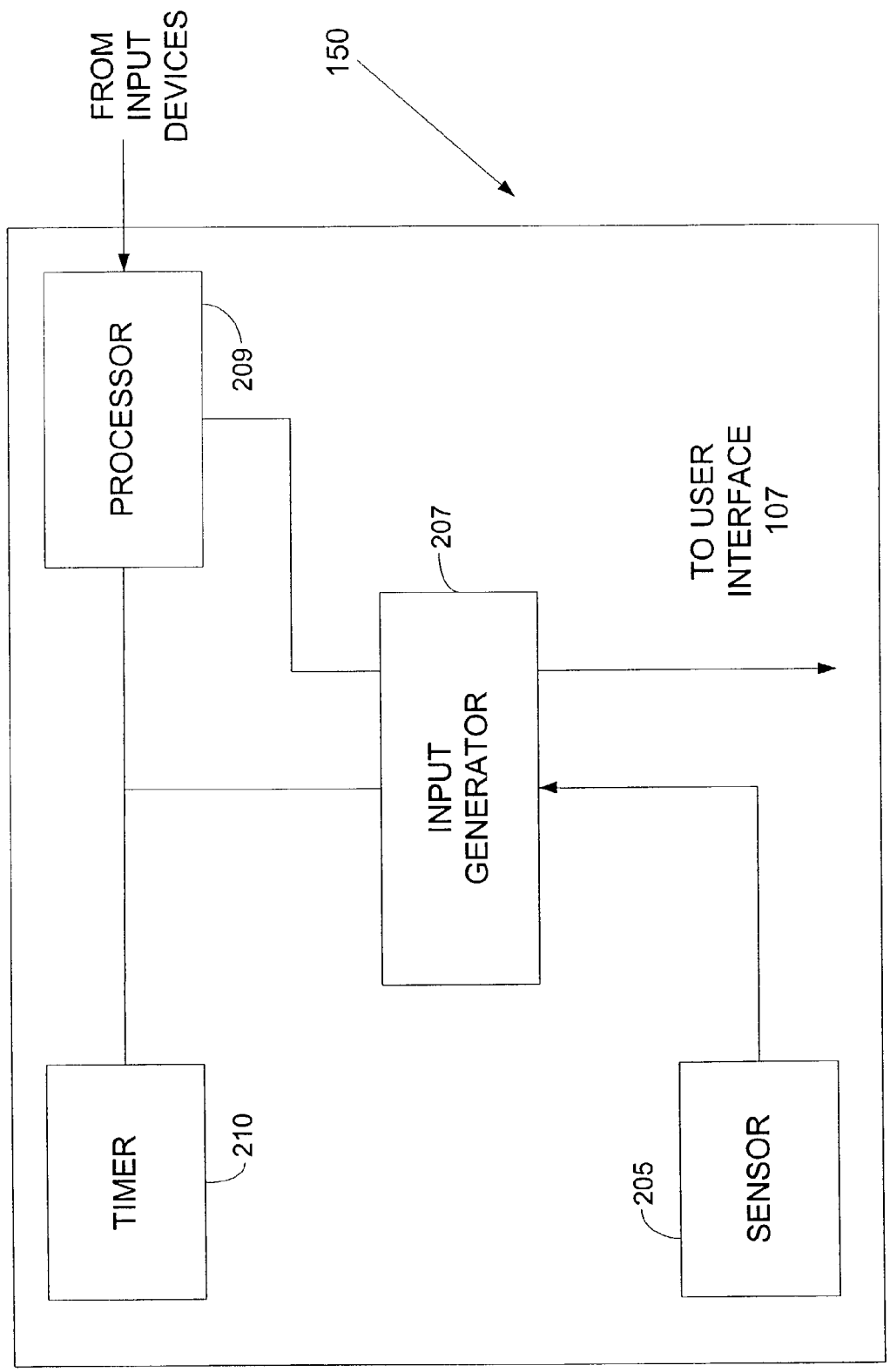
FIG. 2 is a detailed block diagram of the controller shown in FIG. 1.

FIG. 2 is a detailed block diagram of the controller 150 shown in FIG. 1. As shown in FIG. 2, controller 150 includes a motion sensor 205 for sensing motion (such as a motion detector) and an input generator 207 for generating pseudo user inputs corresponding to commands from an input device.

As is known to those skilled in the art, motion sensors, such as those used in motion detectors for security systems, detect rapid changes in infrared energy generated by people or objects and convert this energy into a signal. By way of example, and not limitation, the motion sensor may be a PIR (Passive InfraRed) or pyroelectric sensor. The area of coverage or perimeter of motion sensors may be varied so that they are suited for a particular task. The operation of motion sensors is well known to those skilled in the art.

Input generator 207 is a device for generating pseudo inputs, corresponding to commands produced by computer input devices (such as a keyboard or mouse), from the controller 150 to user interface 107. Input generator 207 may include but is not limited to, a mouse or keyboard interrupt controller for mouse and/or keyboard signals to the computer processor. The operation of interrupt controllers is known to those skilled in the art.

Controller 150 also includes a processor 209, for detecting input signals from input devices 108 and 109 to user interface 107. Controller 150 may also include a timer 210 for controlling the frequency of pseudo inputs generated by input generator 207.

Although the controller 150 is shown as a hardware device in FIG. 1, it will be appreciated by those skilled in the art that the functionality of the controller may be implemented in either hardware or software. Moreover, in an alternate embodiment, those skilled in the art will also appreciate that motion sensor 205, shown as being integrated in the controller 150 in FIG. 2, may also be an external device that may be embedded in video display 113 or an input device such as keyboard 109 or mouse 108. Motion sensor 205 may also be embedded in other computer input devices, such as a trackball or video camera for example.

The operation of controller 150 in preventing the activation of a computer screen saver will now be described with reference to the following description of FIGS. 3 and 4 below.

Figure 3:
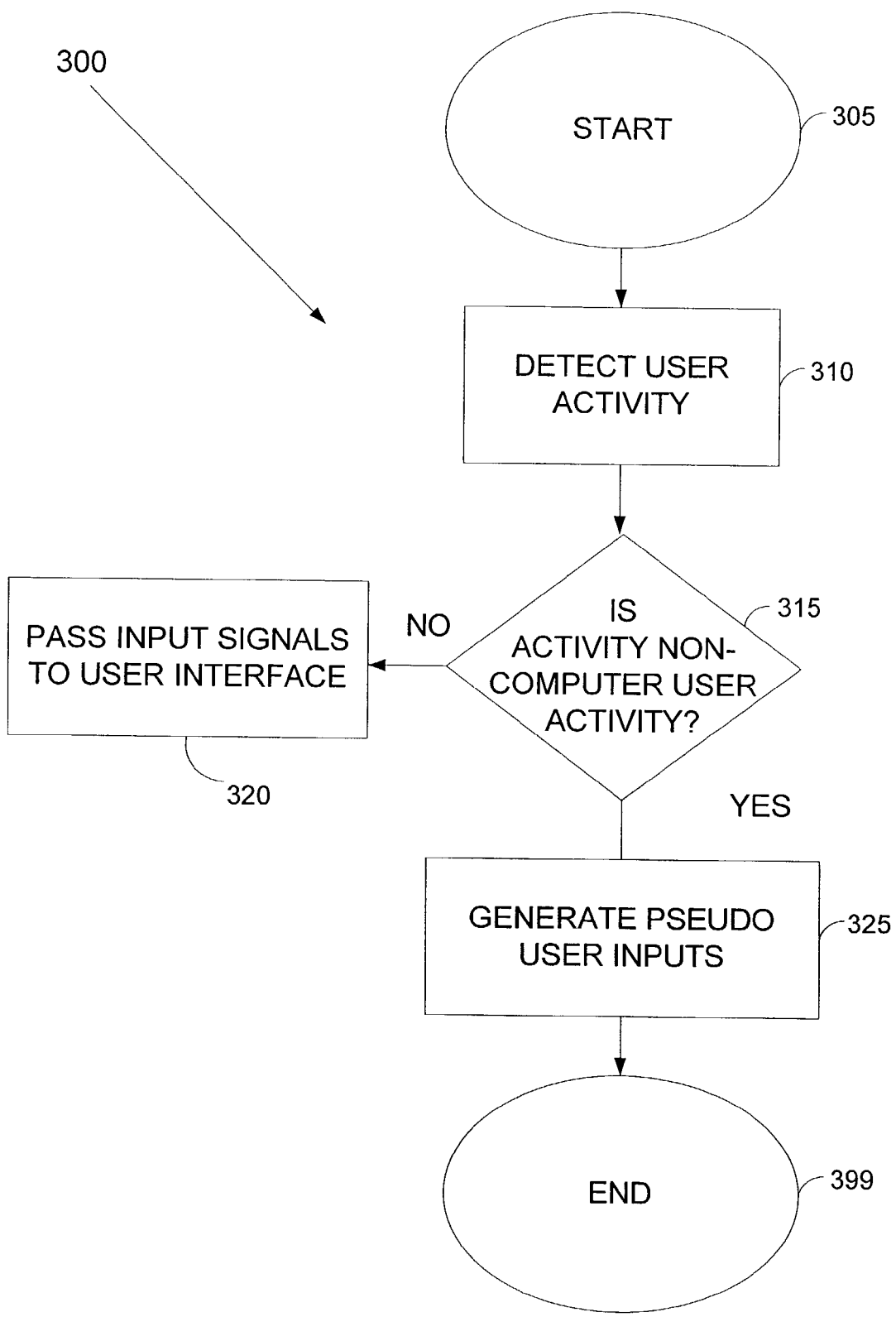
FIG. 3 is a flow chart diagram illustrating a method for preventing the activation of a screen saver in accordance with an embodiment of the present invention.

Referring now to FIG. 3, the method 300 begins at start step 305 which corresponds to a user logging on to computer 101 and proceeds to step 310 where the motion sensor 205 detects user activity in a predetermined perimeter of the computer 101. According to one embodiment, the motion sensor 205 is set to detect motion in the immediate vicinity of the computer so that only the computer user's activity is detected. At step 315, the controller 150 determines whether the user activity detected by the sensor 205 is non-computer user activity. Non-computer user activity is defined as user action not involving user inputs from an input device (such as via a keyboard or mouse) to the computer. Non-computer user activity is determined by processor 209 in the controller 205. As user activity is being detected, processor 209 checks to see if input signals are being received from input devices 108 or 109. If input signals are being received (indicating that the user is using the computer), the controller passes these signals to the user interface 107 at step 320. If the processor 209 determines input signals are not being received (indicating that the user is performing non-computer activity), the processor signals the input generator 207 to generate pseudo user inputs at step 325. The pseudo inputs from input generator 207 are interrupt signals corresponding to commands from a computer input device (such as a keyboard or mouse) to the central processing unit 102 of the computer. Thus, the generated pseudo inputs will prevent the screen saver from activating. The method 300 then ends at step 399.

According to various embodiments of the invention, commands which might be generated by input generator 207 include moving the mouse pointer one pixel in a given direction or inputting a keystroke from a non character-generating key on the keyboard. It is advantageous that the commands be non-disruptive to the computer user while preventing the screen saver from activating. For example, if the user is working on a document on the computer and then turns away to answer the telephone, a pseudo user input corresponding to a command to press the Scroll Lock key (a non-character-generating key) would not disrupt the user's document. Similarly, commands to make imperceptible mouse movements (such as alternatively move the mouse pointer one pixel to the right and then one pixel to the left) would also be non-disruptive to the user when he or she returned to the computer.

Figure 4:
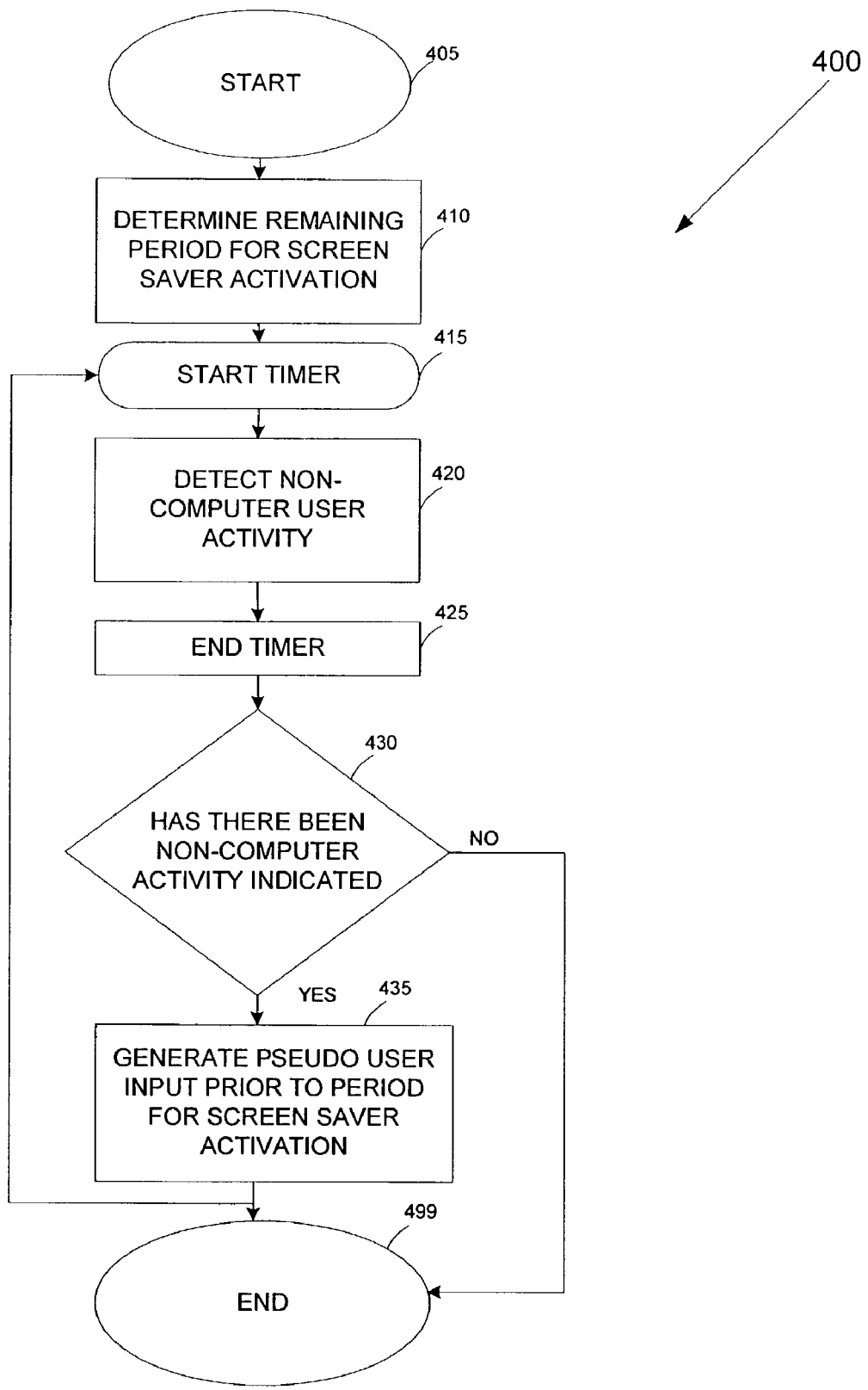
FIG. 4 is a flow chart diagram illustrating a method for preventing the activation of a screen saver in accordance with an alternative embodiment of the present invention.

According to an alternative embodiment, as shown in FIG. 4, the input generator 207 may work together with timer 210 to generate a single pseudo user input to prevent the screen saver from activating. Referring now to FIG. 4, the method 400 begins at start step 405 when the user logs on to the computer 101 to unlock the screen saver and proceeds to step 410 where the processor 209 of controller 150 determines the remaining period for the activation of the screen saver during non-computer activity. The screen saver activation period may be preprogrammed into the processor in any of a variety of methods know to those skilled in the art.

At step 415, the processor 209 starts the timer 210. In one embodiment, the timer 210 may be set to a period which is less than the period for activating the screen saver. For example, if the screen saver activation period is fifteen minutes, the timer may be set for fourteen minutes.

At step 420, the controller begins detecting non-computer user activity (i.e., by determining whether input signals are being received from input devices 108 or 109) in a predetermined perimeter of the computer 101 by starting motion sensor 205, as described above with respect to FIG. 3.

When the timer 210 expires at step 425, the processor 209 determines whether the motion sensor 205 has detected any non-computer activity has taken place during the period. If the processor 209 determines that non-computer activity has taken place during the period the timer 210 was running, the processor 209 signals the input generator 207 to generate a pseudo user input at step 430 to prevent the activation of the screen saver. The method 400 then returns to step 415 to restart the timer 210 to detect non-computer user activity.

If the processor 209 determines that non-computer activity has not taken place during the period the timer 210 was running, the processor 209 allows the screen saver to activate thus ending the method 400 at step 499. The method 400 described in the above embodiment is advantageous in that it prevents multiple interrupt signals from being sent to the central processing unit 102 to prevent the screen saver from activating. Thus, the demand on computer resources is reduced.

It will be apparent to those skilled in the art that various modifications and variations may be made in the present invention without departing from the scope or spirit of the invention. For example, the screen saver program may be incorporated in the operating system of the computer. Other embodiments of the invention will be apparent to those skilled in the art from consideration of the specification and practice of the invention disclosed herein.

The invention claimed is:

1. A method for preventing the activation of a screen saver for locking user access to a computer, the method comprising:
   detecting user activity within a predetermined perimeter of the computer;
   determining whether the user activity is non-computer user activity; and
   if it is determined that the user activity is non-computer user activity, then
      setting a period for generating a pseudo user input; and
      generating the pseudo user input upon occurrence of the period to prevent the activation of the screen saver, wherein the period for generating the pseudo user input is slightly less than a predetermined period for activating the screen saver, thereby minimizing the generation of pseudo user inputs on the computer.

2. The method of claim 1, wherein the step of determining whether the user activity is non-computer activity comprises determining whether an input signal is being received from an input device in communication with the computer.

3. The method of claim 1, wherein the step of generating a pseudo user input further comprises sending a signal to the computer corresponding to a command from an input device.

4. The method of claim 3, wherein the step of sending a signal to the computer corresponding to a command from an input device comprises sending a signal corresponding to a command from a mouse.

5. The method of claim 3, wherein the step of sending a signal to the computer corresponding to a command from an input device comprises sending a signal corresponding to a command from a keyboard.

6. The method of claim 3, wherein the step of sending a signal to the computer corresponding to a command from an input device comprises sending a signal corresponding to a command from a touchpad.

7. A system for preventing the activation of a screen saver, the system comprising:
   a computer; and
   a controller, in communication with the computer,
      for detecting user activity within a predetermined perimeter of the computer;
      for determining that the user activity is non-computer user activity;
      for setting a period for generating a pseudo user input; and
      for generating the pseudo user input upon occurrence of the period to prevent the activation of the screen saver, wherein the period for generating the pseudo user input is slightly less than a predetermined period for activating the screen saver, thereby minimizing the generation of pseudo user inputs on the computer.

8. The system of claim 7, wherein the computer comprises:
   a processor;
   a user interface for sending input signals to the processor; and a video interface for sending video signals to the processor.

9. The system of claim 8, wherein the controller is operatively coupled to the user interface.

10. The system of claim 9, wherein the pseudo user input is generated by an input signal sent from the controller to the processor over the user interface, wherein the input signal corresponds to a command from an input device.

11. The system of claim 10, wherein the input device is a mouse.

12. The system of claim 10, wherein the input device is a keyboard.

13. The system of claim 12, wherein the command includes inputting a keystroke from a non character-generating key on the keyboard.

14. The system of claim 10, wherein the command includes moving the mouse pointer at least one pixel in a predetermined direction.

15. The system of claim 10, wherein the motion sensor is embedded in the input device.

16. The system of claim 10, wherein the motion sensor is embedded in a video display in communication with the video interface.

17. An apparatus for preventing the activation of a screen saver on a computer, the apparatus comprising:
 a motion sensor for detecting user activity within a predetermined perimeter of the computer;
 a processor for determining non-computer user activity;
 a timer for setting a period for generating a pseudo user input; and
 an input generator for generating the pseudo user input upon occurrence of the period to prevent the activation of the screen saver, wherein the period for generating the pseudo user input is slightly less than a predetermined period for activating the screen saver, thereby minimizing the generation of pseudo user inputs on the computer.

* * * * *